US011906614B2

(12) United States Patent
Peng et al.

(10) Patent No.: US 11,906,614 B2
(45) Date of Patent: Feb. 20, 2024

(54) SLOW-TIME MODULATION FOR MULTIPLE RADAR CHANNELS

(71) Applicant: Aptiv Technologies Limited, St. Michael (BB)

(72) Inventors: Zhengyu Peng, Westfield, IN (US); Zhengzheng Li, Agoura Hills, CA (US); Christopher D. Gianelli, Michigan City, IN (US)

(73) Assignee: Aptiv Technologies Limited, St. Michael (BB)

( * ) Notice: Subject to any disclaimer, the term of this patent is extended or adjusted under 35 U.S.C. 154(b) by 142 days.

(21) Appl. No.: 17/356,241

(22) Filed: Jun. 23, 2021

(65) Prior Publication Data

US 2022/0260699 A1 Aug. 18, 2022

Related U.S. Application Data

(60) Provisional application No. 63/148,928, filed on Feb. 12, 2021.

(51) Int. Cl.
*G01S 13/28* (2006.01)
*G01S 7/292* (2006.01)
(Continued)

(52) U.S. Cl.
CPC .......... *G01S 13/288* (2013.01); *G01S 7/2926* (2013.01); *G01S 13/286* (2013.01); *G01S 13/582* (2013.01); *G01S 13/931* (2013.01); *H04B 7/0413* (2013.01)

(58) Field of Classification Search
CPC .... G01S 13/288; G01S 7/2926; G01S 13/286; G01S 13/582; G01S 13/931; H04B 7/0413
See application file for complete search history.

(56) References Cited

U.S. PATENT DOCUMENTS 5,175,554 A * 12/1992 Mangiapane ....... G01S 13/9092
342/149
6,362,774 B1 * 3/2002 Green ................... G01S 13/532
342/195
(Continued)

FOREIGN PATENT DOCUMENTS

EP 3179266 A1 6/2017

OTHER PUBLICATIONS

"Extended European Search Report", EP Application No. 22153190.8, dated Jul. 18, 2022, 8 pages.

*Primary Examiner* — Bernarr E Gregory
*Assistant Examiner* — Kenneth W Good
(74) *Attorney, Agent, or Firm* — Harness, Dickey & Pierce, P.L.C.

(57) ABSTRACT

This document describes techniques and systems directed at slow-time modulation for multiple radar channels. A set of transmit channels are modulated using code sequences to phase-modulate transmission signals. A second set of transmit channels are modulated using the same codes for phase modulation as well as using a frequency phase shift. Demodulation is achieved by multiplying received signals by the code sequences. Fast Fourier transforms (FFT) are applied to the received signals to generate a range-Doppler map for each receive channel. A non-coherent integration is performed on the range-Doppler maps to form a range-Doppler average map. The range-Doppler average map is shifted by the frequency phase shift, and the minimal of the range-Doppler average map and the shifted range-Doppler average map is retained. These techniques may reduce the impact of signal residue and increase angular resolution by enabling multiple transmit channels to be utilized.

20 Claims, 7 Drawing Sheets

(51) Int. Cl.
    *G01S 13/58*     (2006.01)
    *G01S 13/931*     (2020.01)
    *H04B 7/0413*     (2017.01)

(56) References Cited

U.S. PATENT DOCUMENTS

| | | | |
|---|---|---|---|
| 7,474,262 B2 | 1/2009 | Alland | |
| 8,787,143 B2* | 7/2014 | Malladi | H04L 5/0051 370/335 |
| 9,182,476 B2 | 11/2015 | Wintermantel | |
| 9,575,160 B1* | 2/2017 | Davis | G01S 7/35 |
| 9,791,564 B1* | 10/2017 | Harris | G01S 13/931 |
| 9,952,319 B2 | 4/2018 | Searcy et al. | |
| 11,428,778 B2* | 8/2022 | Bauduin | G01S 7/038 |
| 2006/0245472 A1* | 11/2006 | Pan | H04B 1/711 375/144 |
| 2017/0160380 A1* | 6/2017 | Searcy | G01S 7/2921 |
| 2020/0025914 A1* | 1/2020 | Li | G01S 13/878 |
| 2020/0081110 A1* | 3/2020 | Nam | G01S 13/42 |
| 2021/0096233 A1* | 4/2021 | Jadidian | G01S 7/2806 |
| 2021/0173042 A1* | 6/2021 | Wu | G01S 13/584 |
| 2021/0364599 A1* | 11/2021 | Roger | G01S 7/356 |
| 2022/0236372 A1* | 7/2022 | Elad | H01Q 3/38 |

\* cited by examiner

ID="1" />
SLOW-TIME MODULATION FOR MULTIPLE RADAR CHANNELS

CROSS-REFERENCE TO RELATED APPLICATION

This application claims the benefit under 35 U.S.C. 119(e) of U.S. Provisional Application No. 63/148,928, filed Feb. 12, 2021, the disclosure of which is incorporated by reference in its entirety herein.

BACKGROUND

Multiple-input multiple-output (MIMO) radar systems may have multiple transmit and receive channels. A greater quantity of channels results in better angular resolution. However, there are drawbacks to increasing the quantity of channels, such as, a reduction in signal-to-noise ratio (SNR), a reduced Doppler coverage, and in some cases, a negative impact on the Doppler dynamic range and limits to a quantity of simultaneous-transmit channels. Radar systems are fundamental to some advanced safety and autonomous driving systems, which are becoming standard equipment in today's modern automobiles. Low-cost radar systems that can simultaneously process multiple high-resolution channels are desirable for improving driving safety.

SUMMARY

This document describes techniques and systems directed at slow-time modulation for multiple radar channels. A set of transmit channels are modulated using code sequences to phase-modulate transmission signals. A second set of transmit channels are modulated using the same codes for phase modulation as well as using a frequency phase shift. Demodulation is achieved by multiplying received signals by the code sequences. Fast Fourier transforms (FFT) are applied to the received signals to generate a range-Doppler map for each receive channel. A non-coherent integration is performed on the range-Doppler maps to form a range-Doppler average map. The range-Doppler average map is shifted by the frequency phase shift, and the minimal of the range-Doppler average map and the shifted range-Doppler average map is retained. These techniques may reduce the impact of signal residue and increase angular resolution by enabling multiple transmit channels to be utilized.

In one example, a method includes modulating, by a radar system, based on a first set of code sequences, a first set of transmit channels to transmit a plurality of chirp signals with a phase-modulation that is defined by the first set of code sequences. The method further includes modulating, by the radar system, a second set of transmit channels based on: the first set of code sequences, the second set of transmit channels to transmit a plurality of chirps with the phase-modulation that is defined by the first set of code sequences; and a first set of frequency phase-shift sequences, the second set of transmit channels to transmit a plurality of chirp signals with a frequency phase-shift that is defined by the first set of frequency phase-shift sequences. The method further includes, responsive to transmitting the plurality of chirp signals associated with the first set of transmit channels and the plurality of chirp signals associated with the second set of transmit channels, receiving, from one or more receive channels, a plurality of chirp returns. The method further includes, responsive to demodulating the plurality of chirp returns based on the first set of code sequences, outputting, by the radar system, to an automotive system, radar data identifying objects inferred from the demodulated plurality of chirp returns.

In another example, a radar system includes a first set of transmit channels, a second set of transmit channels, one or more receive channels, and at least one processor configured to perform this and other methods set forth herein, in addition to describing systems configured to perform the above-summarized method and the other methods set forth herein.

This Summary introduces simplified concepts of slow-time modulation for multiple radar channels. This Summary is not intended to identify essential features of the claimed subject matter, nor is it intended for use in determining the scope of the claimed subject matter. That is, one problem solved by the described techniques is increasing the quantity of channels that can be used with minimal negative impact. Therefore, although primarily described in the context of improving radar system functionality of an automotive vehicle, slow-time modulation for multiple radar channels can be applied to other applications where increased angular resolution is desired.

BRIEF DESCRIPTION OF THE DRAWINGS

The details of one or more aspects of slow-time modulation for multiple radar channels are described in this document with reference to the following figures. The same numbers are often used throughout the drawings to reference like features and components:

FIGS. 5-1 and 5-2 illustrate example Doppler plots of a range-Doppler map generated by slow-time modulation for multiple radar channels, in accordance with techniques of this disclosure.

DETAILED DESCRIPTION

Overview

Radar systems are being utilized in many applications, including autonomous vehicles. Multiple-input multiple-output (MIMO) radar systems are particularly suited for vehicles because the MIMO radar systems are able to detect and track multiple objects well. Yet, MIMO radar systems still have room for improvement. It can be desirable for a MIMO radar system to be able to simultaneously handle a large quantity of channels with high angular resolution. Manufacturers are continuously striving to advance MIMO radar technology by increasing angular resolution and reducing, or at least minimizing, the effects of signal residue.

Reaching these goals may ultimately increase the safety of vehicles using the improved radar systems.

MIMO radar systems utilize multiple transmit and receive channels that are essentially signal paths that propagate signals between antennas and transmitters or receivers. Increasing the quantity of channels in a MIMO radar system may increase angular resolution. An advantage of higher angular resolution is the ability to detect a smaller object next to a larger object. However, generally, increasing the quantity of channels may increase the signal residue, which is the distributed energy from suppressed signals present in a recovered signal, experienced by each receive channel. Higher signal residue may reduce the Doppler dynamic range.

As a MIMO radar requires all of the transmit channels to be orthogonal to one another, several methods of achieving orthogonality have been employed. One method is time-multiplexing, which uses a different time slot for each transmitter channel. The time-multiplexing method increases the pulse-repetition period and, thus, reduces the Doppler coverage. This method also reduces the signal-to-noise ratio (SNR) due to a reduced duty cycle for each transmitter channel.

Another approach to achieving orthogonality is to apply binary phase modulation (BPM). BPM enables a radar sensor to transmit simultaneously on multiple channels. Though BPM does not degrade the Doppler coverage or the SNR, it has some negative impact on the Doppler dynamic range and limits the number of channels that are able to transmit simultaneously. Signal residue present during demodulation may degrade Doppler dynamic range. With an increase in transmit channels, the degradation is more severe. Degradation of the Doppler dynamic range may make it difficult to detect a smaller object next to a larger object. For example, a radar could miss detecting a pedestrian next to an automobile.

To overcome some of the challenges and drawbacks of previous modulation methods, this document describes a slow-time modulation process to improve both SNR and angular resolution. This proposed modulation method, as described herein, combines code-division multiplexing (CDM) and frequency-division multiplexing (FDM) to increase the quantity of channels that may be utilized in MIMO radar scheme. The proposed modulation technique maintains residue levels similar to time-division multiplexing (TDM). Additionally, SNR is improved over TDM and approaches SNR levels attained by CDM. In this manner, angular resolution may be increased, and a maximum Doppler dynamic range may be retained.

Example Environment

Figure 1:
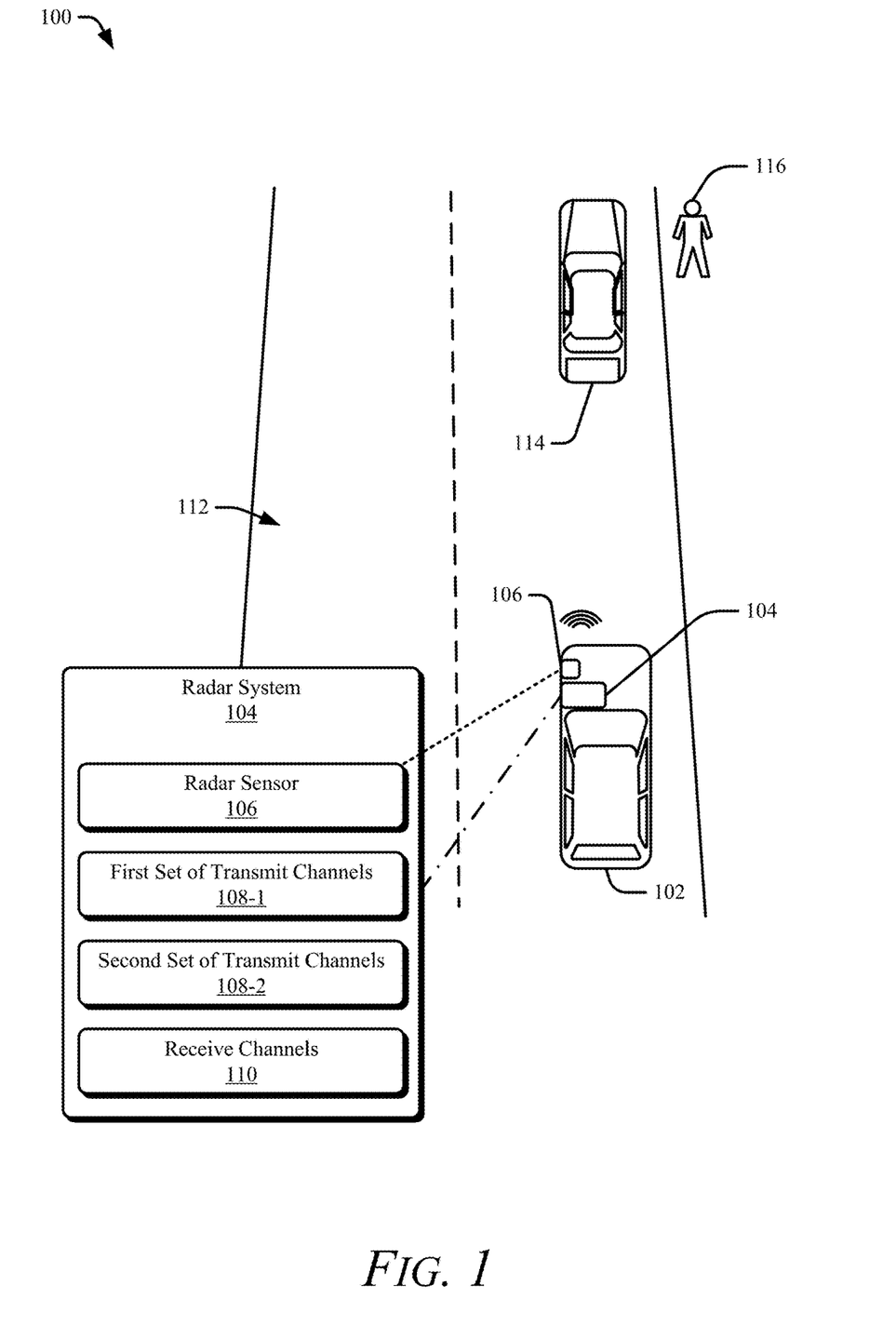
FIG. 1 illustrates an example environment in which slow-time modulation for multiple radar channels can be applied, in accordance with techniques of this disclosure.

FIG. 1 illustrates an example environment 100 in which slow-time modulation for multiple radar channels can be applied, in accordance with techniques of this disclosure. A vehicle 102 is equipped with a radar system 104 configured for slow-time modulation for multiple radar channels. Although depicted as a car, the vehicle 102 can represent other types of vehicles and machinery (e.g., a motorcycle, a bus, a tractor, a semi-trailer truck, watercraft, aircraft, or other heavy equipment), including manned and unmanned systems that may be used for a variety of purposes. The vehicle 102 is traveling on a road 112. Moving or stationary objects may, likewise, be in or near the road 112, for example, a vehicle 114 and a pedestrian 116.

The radar system 104 includes at least one radar sensor 106, a first set of transmit channels 108-1, a second set of transmit channels 108-2, and one or more receive channels 110. More sets of transmit channels 108 may also be included. The radar system 104 can detect objects in a field-of-view (FOV) based on radar signals transmitted by the first set of transmit channels 108-1 and the second set of transmit channels 108-2 reflected off of objects, such as the vehicle 114 and the pedestrian 116, and received by the set of receive channels 110. The radar system 104 may be able to detect the vehicle 114 and the pedestrian 116, even if they are in close proximity to each other. This may be a result of having an increase in angular resolution from maximizing the quantity of transmit channels being employed.

In general, manufacturers can mount the radar system 104 to any moving platform that can travel on the road 112. For example, manufacturers can integrate features of the radar system, such as one or more radar sensors, into a side mirror, roof, bumper, or any other interior or exterior location where the FOV includes the road 112 and any targets, moving or stationary, that are near the road 112. In the example, a portion of the radar system 104 is mounted near the front bumper of the vehicle 102.

The radar system 104 comprises machine-readable instructions that, when executed by a processor or other logic of the radar system 104, cause the processor or other logic to modulate, transmit, receive, and demodulate radio frequency (RF) energy to detect and identify targets. The radar system 104 may include a combination of hardware, software, and/or firmware for detecting and identifying targets for an automotive system.

The first set of transmit channels 108-1 is modulated based on a set of code sequences, each code sequence corresponding to an individual transmit channel in the first set of transmit channels 108-1. The code sequences are unique, with respect to one another, and may be generated by a random number generator. The code sequences are applied to a plurality of chirp signals to be transmitted by the first set of transmit channels 108-1. One example of this modulation scheme is BPM.

The second set of transmit channels 108-2 is modulated by two modulation schemes. A first of the two modulation schemes is identical to the scheme used on the first set of transmit channels 108-1. Then, a second of the two modulation schemes includes a frequency phase-shift that is applied to the chirp signals to be transmitted by the second set of transmit channels 108-2. The phase shift may be a rotator phase shift. By further modulating the second set of transmit channels 108-2 with the second modulation scheme, the impact of signal residue, experienced by each individual channel, may be reduced, thus, enabling the radar system 104 to employ a greater quantity of transmit channels without degrading the Doppler dynamic range of the radar system 104.

The one or more receive channels 110 receive the chirp returns associated with the first set of transmit channels 108-1 and the second set of transmit channels 108-2. Once the chirp returns are demodulated, the radar data may identify objects inferred from the chirp returns and can be output to an automotive system. The automotive system can use the radar data to assist in driving operations, which can improve safety in operating the vehicle 102.

Figure 2:
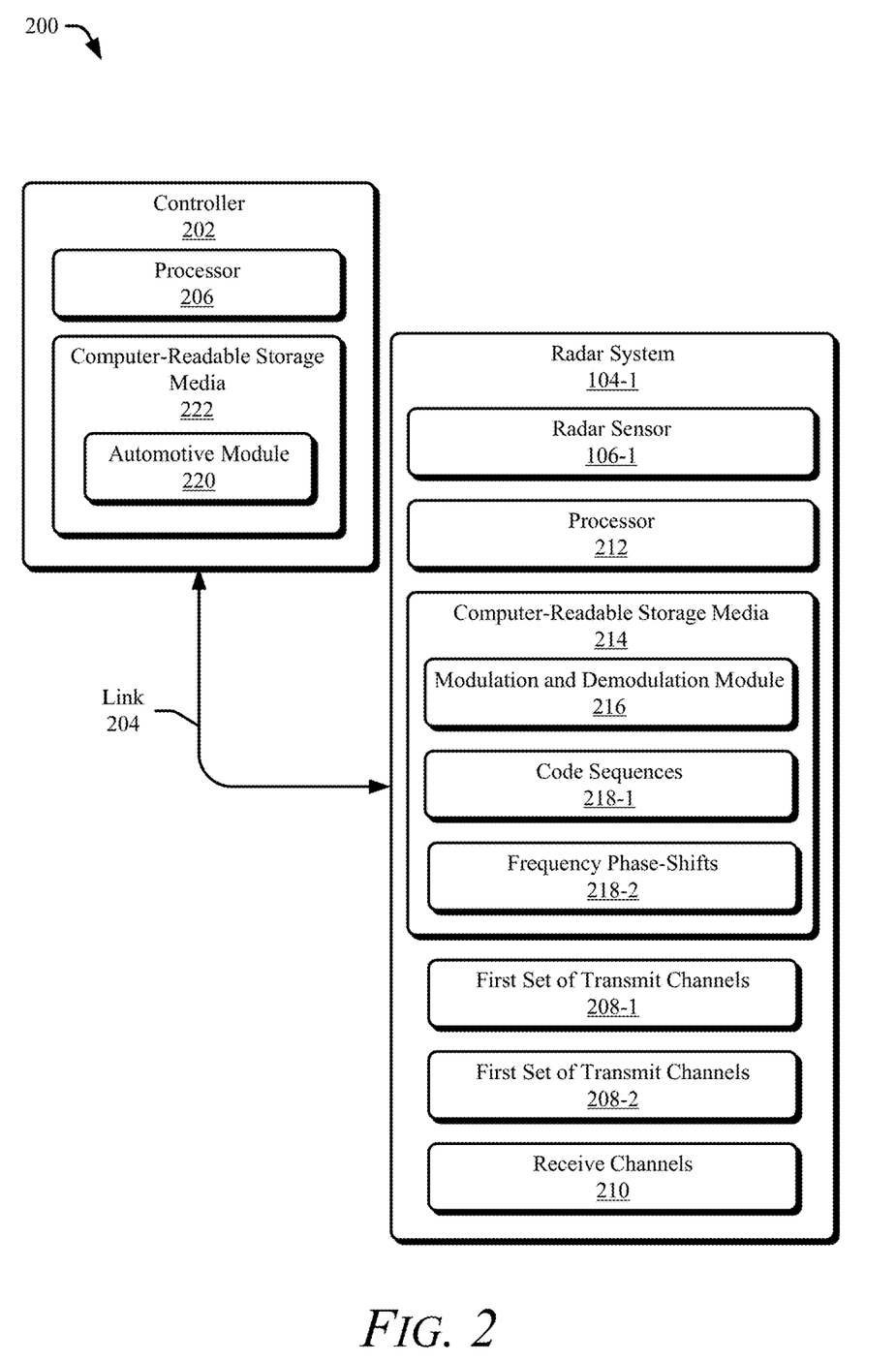
FIG. 2 illustrates an example automotive system configured to perform slow-time modulation for multiple radar channels, in accordance with techniques of this disclosure.

FIG. 2 illustrates an example automotive system 200 configured to perform slow-time modulation for multiple radar channels, in accordance with techniques of this disclosure. The automotive system 200 can be integrated within the vehicle 102.

The automotive system 200 includes a controller 202 and a radar system 104-1, which is an example of the radar system 104. The radar system 104-1 includes a radar sensor 106-1, however, any number of radar sensors 106-1 may be used. The controller 202 and the radar system 104-1 communicate over a link 204. The link 204 may be a wired or wireless link and, in some cases, includes a communication bus. The controller 202 performs operations based on information received from the radar system 104-1, over the link 204, such as data output from the radar system 104-1, including information indicative of one or more objects identified and tracked in the FOV.

The controller 202 includes a processor 206 and a computer-readable storage media (CRM) 222 (e.g., a memory, long-term storage, short-term storage), which stores instructions for an automotive module 220. The radar system, likewise, includes processing hardware that may include a processor 212 and a computer-readable storage media (CRM) 214. The processors 206 and 212 can be two separate or a single microprocessor, or a pair of or a single system-on-chip of a computing device, a controller, or a control unit. The processors 206 and 212 execute computer-executable instructions stored within the CRMs 222 and 214.

The processor 206 can execute the automotive module 220 to perform a driving function or other operation of the automotive system 200, which may include using output from the radar system 104-1 to assist in determining driving decisions. For example, the automotive module 220 can provide automatic cruise control and monitor the radar system 104-1 for output that indicates the presence of objects in the FOV, for instance, to slow the speed and prevent a collision with the vehicle 114 or the pedestrian 116. The automotive module 220 may provide alerts or perform a specific maneuver when the data obtained from the radar system 104-1 indicates that one or more objects are crossing in front of the vehicle 102.

The CRM 214 stores a modulation and demodulation module 216 associated with the radar system 104-1. The CRM, likewise, stores code sequences 218-1 and frequency phase shifts 218-2 that are used by the modulation and demodulation module 216 to modulate radar signals, transmitted by the first and second sets of transmit channels 208-1 and 208-2, and demodulate signal returns received by the receive channels 210. Objects in the FOV can be inferred based on the demodulated signal returns obtained from multiple different sensors 106 of the vehicle 102. The automotive module 220, when executing at the processor 206, can receive an indication of one or more objects detected by the radar system 104-1 in response to the radar system 104-1 combining and analyzing sensor data generated at each of the sensors 106 (e.g., the radar sensor 106-1).

Also shown in FIG. 2, the radar system 104 includes at least a first set of transmit channels 208-1 and a second set of transmit channels 208-2, as well as a set of receive channels 210. The radar system 104 is not limited to two sets of transmit channels 208 and may include more sets of transmit channels than are depicted.

Example Modulation and Demodulation Schemes

Figure 3:
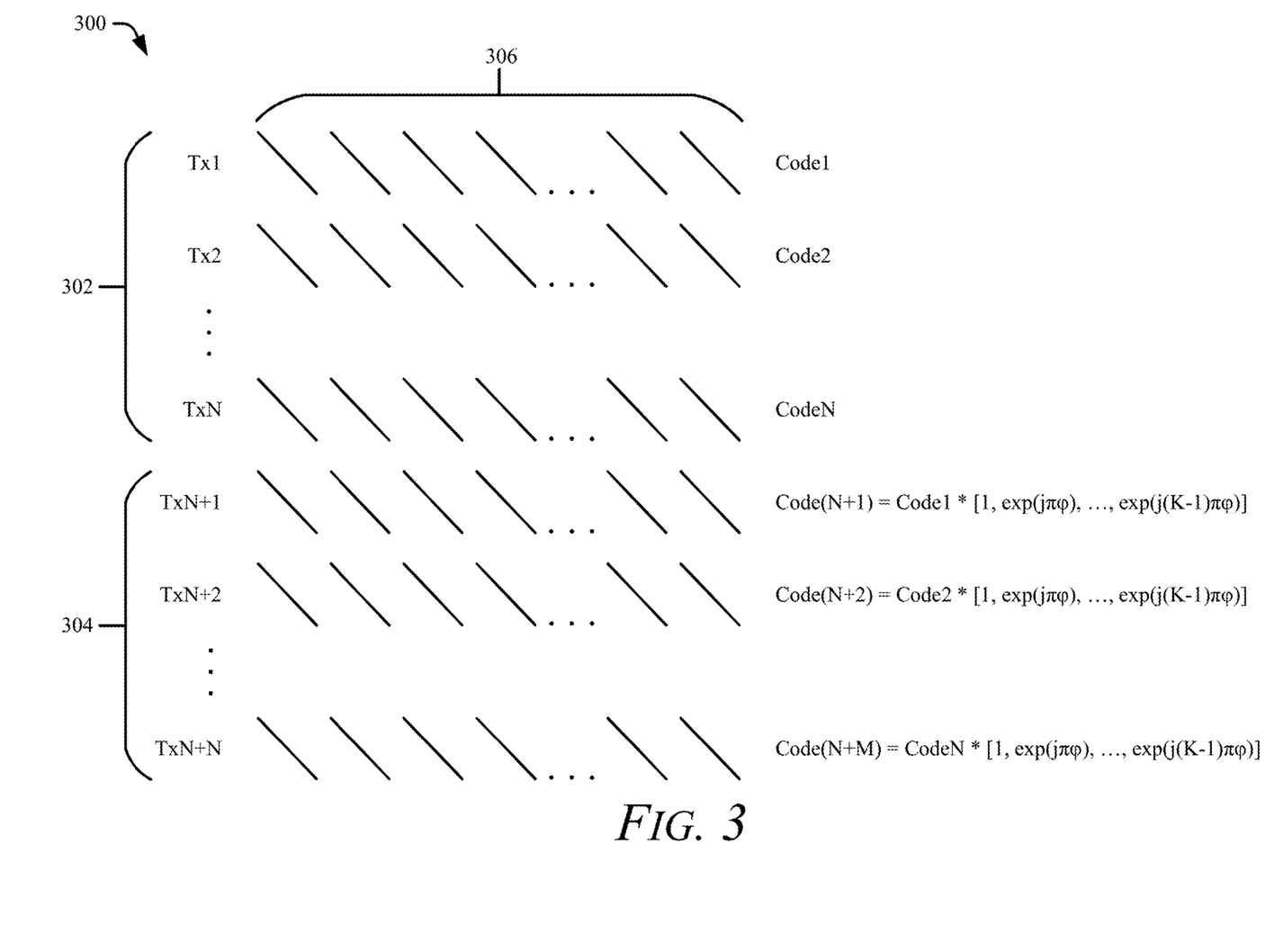
FIG. 3 illustrates an example modulation scheme that can be used to perform slow-time modulation for multiple radar channels, in accordance with techniques of this disclosure.

FIG. 3 illustrates an example modulation scheme 300 that can be used to perform slow-time modulation for multiple radar channels, in accordance with techniques of this disclosure. The modulation scheme 300 is executed by the modulation and demodulation module 216 from FIG. 2. The example modulation scheme 300 includes transmitting, by a radar system, using a first set of transmit channels 302 and a second set of transmit channels 304. For simplicity, the modulation scheme 300 is described as causing transmissions from just two sets of transmit channels; however, more than two sets of transmit channels can be used.

The first set of transmit channels 302 comprises transmit channels Tx1 through TxN that can transmit a series of chirps 306. The first set of transmit channels 302 can be modulated by CDM (e.g., BPM) and using a sequence of codes (Code1 through CodeN) to combine with and modulate the chirps 306. Each code in the sequence of codes can be generated with a random number generator and can be unique with regards to the other codes in the sequence.

The second set of transmit channels 304 can be modulated using the same sequence of codes as the first set of transmit channels 302 as well as a frequency shift sequence (e.g., [1, $\exp(j\pi\varphi)$, $\exp(j\pi\varphi)$, ..., $\exp(j(K-1)\pi\varphi)$], where K is the number of chirps in the series and $\varphi$ is the frequency shift). If more than two sets of transmit channels are utilized, $\varphi$ can be a different value for each set of transmit channels that are being frequency shifted.

Figure 4:
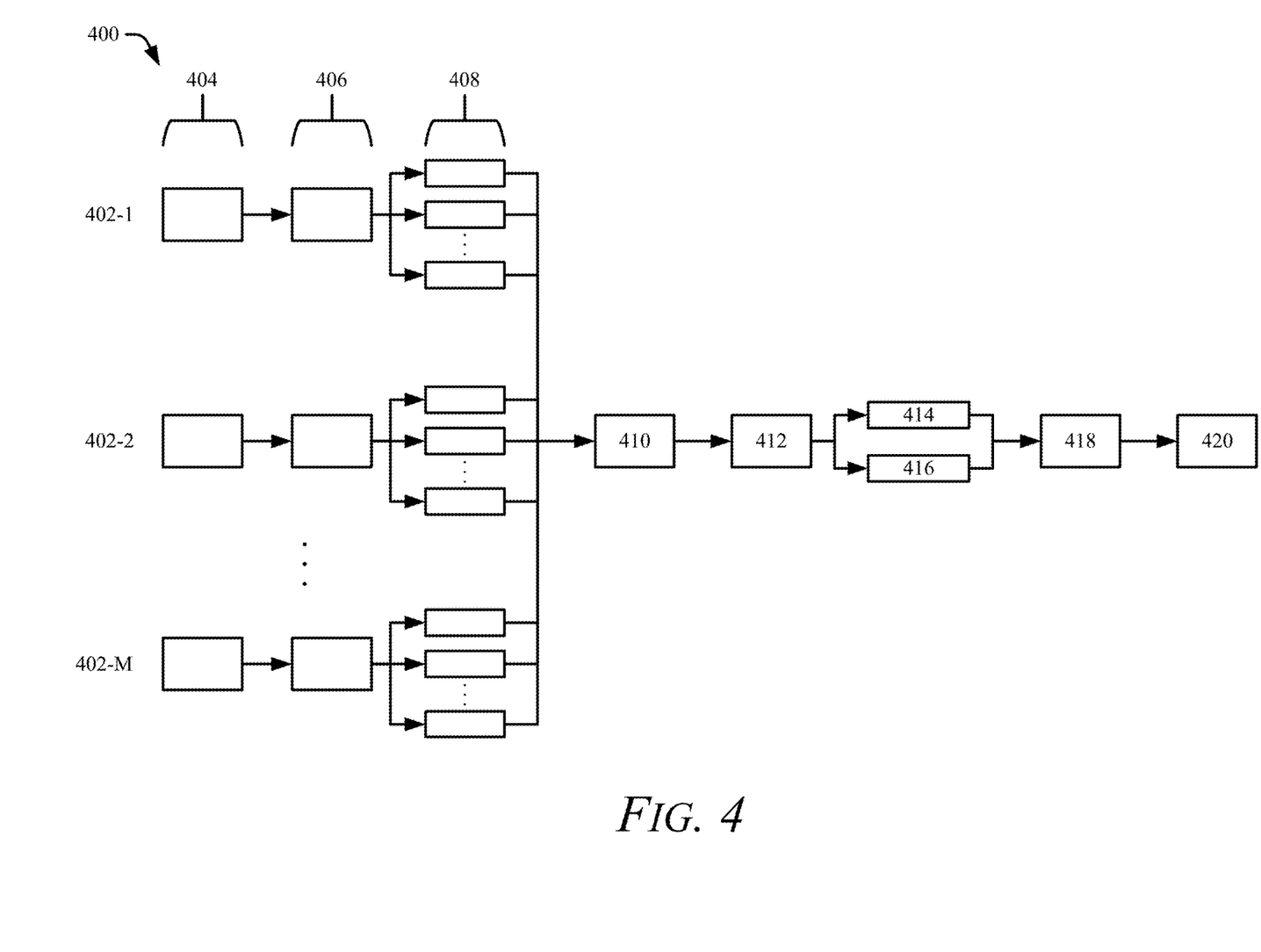
FIG. 4 illustrates an example demodulation scheme that can be used to perform slow-time modulation for multiple radar channels, in accordance with techniques of this disclosure.

FIG. 4 illustrates an example demodulation scheme 400 that can be used to perform slow-time modulation for multiple radar channels, in accordance with techniques of this disclosure. The example demodulation scheme 400 is executed by the modulation and demodulation module 216 from FIG. 2. The example demodulation scheme 400 includes receiving, by the radar system, using a set of receive channels 402 (e.g., receive channels 402-1 through 402-M).

When the receive channels 402 receive chirp returns, the chirp returns are formatted for further processing (e.g., analog signals are digitized into digital versions representative of the chirp returns received over time), and at 404, a range FFT is applied to the chirp returns. At 406, the chirp returns are demodulated by multiplying them by the sequence of codes used to modulate the chirps 306 and Doppler FFT are applied to the chirp returns. At 408, the result of the previous steps is that each receive channel 402 has generated a quantity of range-Doppler maps that is equal to the quantity (N) of transmit channels in each set of transmit channels (e.g., the first set of transmit channels 302 and the second set of transmit channels 304).

At 410, a non-coherent integration is performed for all the range-Doppler maps to form a single range-Doppler average map. At 412, a rotator shift (e.g., frequency shift $\varphi$) is applied to the range-Doppler average map, creating a shifted range-Doppler average map. The range-Doppler average map 414 and the shifted range-Doppler average map 416 are compared, and the minimal is selected at 418. The minimal range-Doppler map 420 is further used by the radar system as radar data output to a tracking system or an automotive system to identify and avoid targets.

Example Implementation

Figure 51:
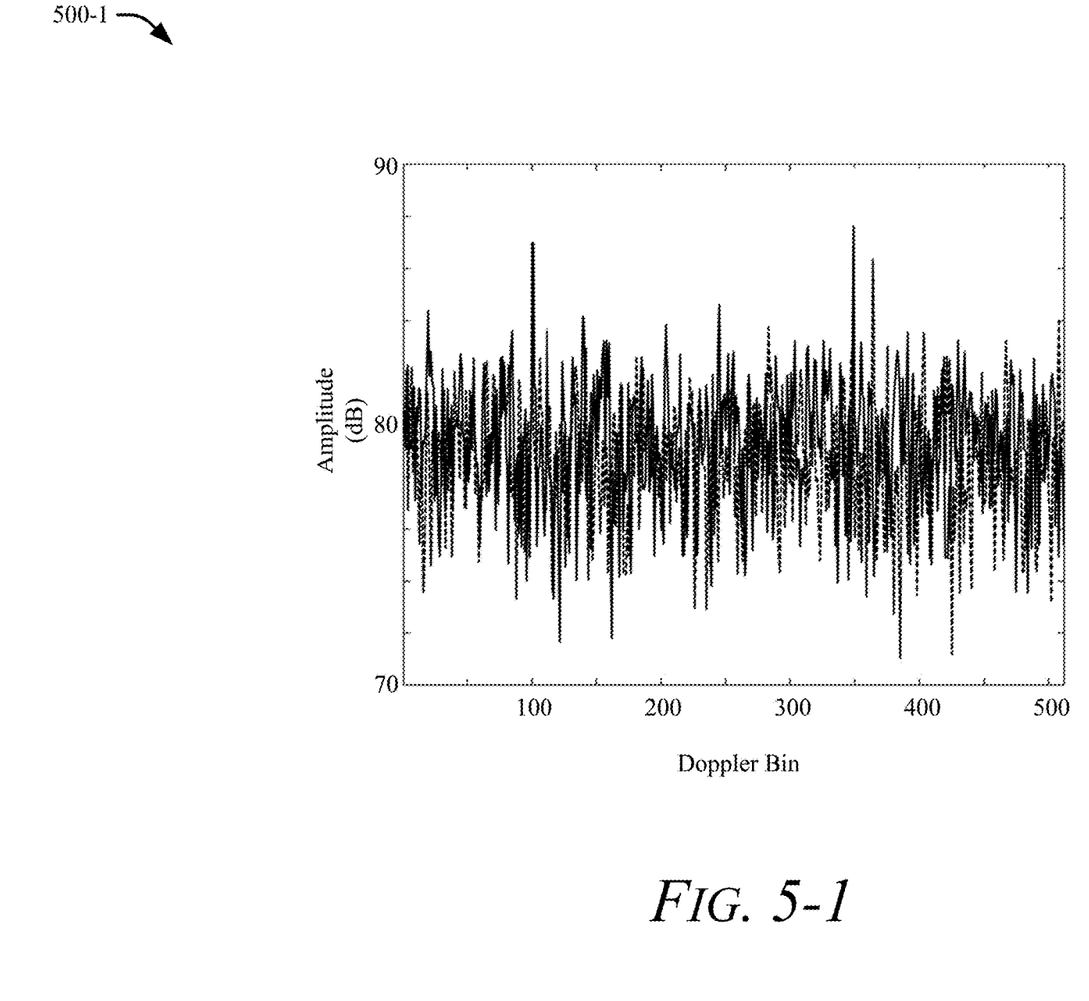
Figure 52:
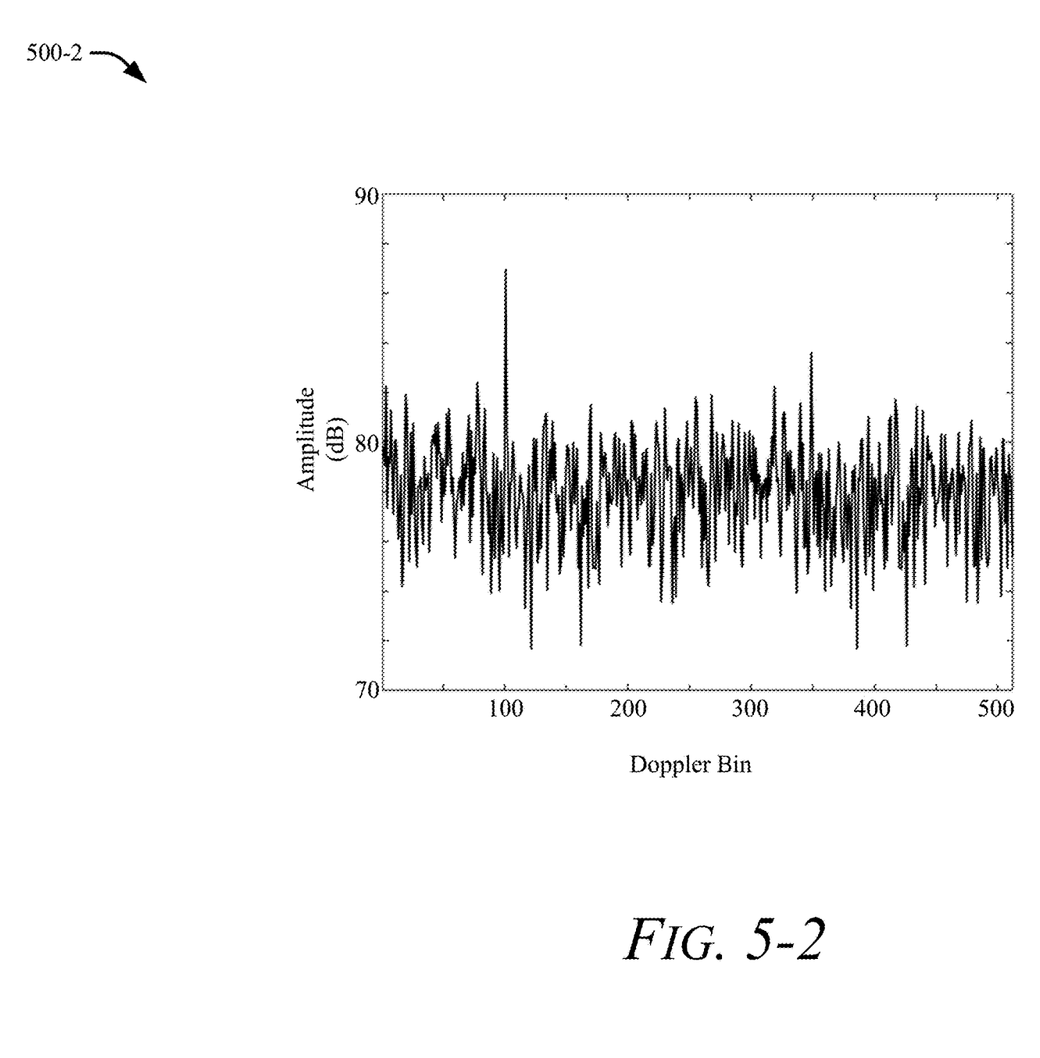

FIGS. 5-1 and 5-2 illustrate example Doppler plots (500-1, 500-2) of a range-Doppler map generated by slow-time modulation for multiple radar channels, in accordance with techniques of this disclosure. To generate the example range-Doppler plot 500-1, three BPM code sequences and one frequency shift can be used. The frequency shift can be set to $\varphi=0.9688$ radians with 6-bit phase shifters. After step 410 from FIG. 4 is performed, the range-Doppler map is generated. In the range-Doppler map, the number of peaks is twice the number of targets. For example, one target may be at Doppler bin 101, and the generated range-Doppler map may include two peaks with one peak at Doppler bin 101 and the other peak at Doppler bin 349 as illustrated by the solid curve in the Doppler plot 500-1. After the rotator shift at step 412, Doppler bin 249-512 is shifted to Doppler bin 1-263 and Doppler bin 1-248 is shifted to Doppler bin 264-512, as illustrated by the dashed curve in the Doppler plot 500-1. After taking the minimal between the solid curve and the dotted curve, the one single curve is illustrated as Doppler plot 500-2. The example implementation used to create the Doppler plots 500-1 and 500-2 can have advantages over other modulation schemes using the same example parameters. For example, using a TDM scheme may result in approximately 3 decibels (dB) of SNR loss compared to the scheme described in the example implementation. The Doppler dynamic range degradation can be less than with a BPM scheme. Additionally, the example implementation can require less processing to compensate for signal residue.

Example Method

Figure 6:
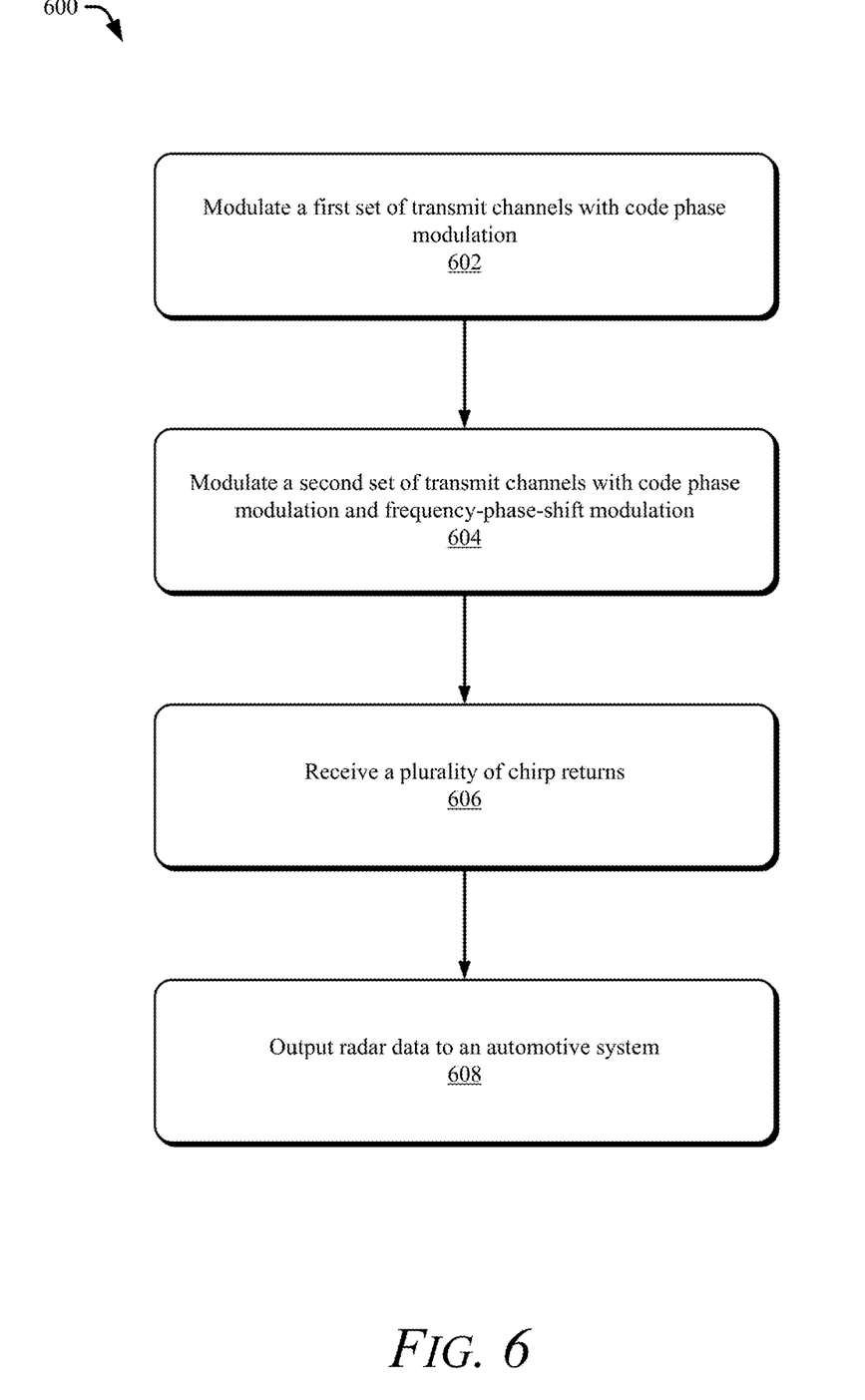
FIG. 6 illustrates an example method of slow-time modulation for multiple radar channels, in accordance with techniques of this disclosure.

FIG. 6 illustrates an example method 600 of slow-time modulation for multiple radar channels, in accordance with techniques of this disclosure. At 602, a first set of transmit channels to transmit a plurality of chirp signals are modulated based on a first set of code sequences. The code sequences define a phase-modulation. For example, the first set of transmit channels 208-1 from FIG. 2 are modulated by the modulation and demodulation module 216 using the code sequences 218-1 and a CDM scheme. The chirp signals associated with each transmit channel are combined with the code sequence of each transmit channel. The code sequences may be binary code sequences (e.g., BPM) that, when combined with the chirp signals, either phase-shift an individual chirp signal by $\pi$ or does not phase-shift the chirp signal.

At 604, a second set of transmit channels to transmit a plurality of chirp signals are modulated based on the first set of code sequences. The second set of transmit channels are also modulated based on a first set of frequency phase-shift sequences that define a frequency phase-shift. Likewise, in the same example, the second set of transmit channels 208-2 from FIG. 2 are modulated by the modulation and demodulation module 216 using the code sequences 218-1 and, additionally, the frequency phase-shifts 218-2. Using a combination of CDM and FDM on the second (and subsequent) set of transmit channels 208-2 enables more channels to be utilized while minimizing the negative impact of the increased quantity of channels.

At 606, in response to transmitting the chirp signals associated with the first set of transmit channels and the second set of transmit channels, one or more receive channels receive a plurality of chirp returns. In the example, the one or more receive channels 210 can receive the plurality of chirp returns associated with the first set of transmit channels 208-1 and the second set of transmit channels 208-2. The one or more receive channels 210 demodulate the chirp returns by applying both the code sequences 218-1 and the frequency phase-shifts 218-2. In this example, the demodulation process may further include applying a range FFT and a Doppler FFT to the chirp returns. At this step, the chirp returns are demodulated based on the code sequences 218-1, and a range-Doppler map is generated for each receive channel. A non-coherent integration is performed on the range-Doppler maps generated by each receive channel to generate a single range-Doppler average map. The range-Doppler average map can be frequency phase-shifted using the frequency phase-shifts 218-2 to create a shifted range-Doppler average map. The range-Doppler average map and the shifted range-Doppler average map can be compared, and the minimal map can be chosen to be used by the radar system 104-1 or the automotive module 220. At 608, in response to demodulating the plurality of chirp returns, the radar system outputs radar data identifying objects inferred from the demodulated plurality of chirp returns to an automotive system. In the example, the radar system 104-1 can output radar data, inferred from the demodulated plurality of chirp returns, via the link 204 to the automotive module 220 of the automotive system 200. Due to multiple transmit channels being employed by the radar system 104-1, the radar data may have a sufficient Doppler dynamic range to detect large and small objects (e.g., the vehicle 114 and the pedestrian 116 from FIG. 1), even if the large and small objects are in close proximity to one another. The automotive module 200 may initiate a maneuver (e.g., slowing down, swerving) or alert an operator of the host vehicle (e.g., the vehicle 102) of any objects identified by the radar data. In the scenario, the pedestrian 116 may be walking behind the vehicle 114 and crossing the road 112. Vehicle 102, equipped with the radar system 104, that uses slow-time modulation for multiple radar channels, detects both the vehicle 114 and the pedestrian 116. As the pedestrian 116 steps out into the road 112 in front of the vehicle 102, the vehicle 102 is able to brake the vehicle and avoid the pedestrian 116. In this manner, collisions and injuries may be avoided due to the Doppler dynamic range having an angular resolution that enables radar-tracking of large and small objects in the field of view, even when the large and small objects are near one another.

ADDITIONAL EXAMPLES

Example 1: A method, the method comprising: modulating, by a radar system, based on a first set of code sequences, a first set of transmit channels to transmit a plurality of chirp signals with a phase-modulation that is defined by the first set of code sequences; modulating, by the radar system, a second set of transmit channels based on: the first set of code sequences, the second set of transmit channels to transmit a plurality of chirps with the phase-modulation that is defined by the first set of code sequences; and a first set of frequency phase-shift sequences, the second set of transmit channels to transmit a plurality of chirp signals with a frequency phase-shift that is defined by the first set of frequency phase-shift sequences; responsive to transmitting the plurality of chirp signals associated with the first set of transmit channels and the plurality of chirp signals associated with the second set of transmit channels, receiving, from one or more receive channels, a plurality of chirp returns; and responsive to demodulating the plurality of chirp returns based on the first set of code sequences, outputting, by the radar system, to an automotive system, radar data identifying objects inferred from the demodulated plurality of chirp returns.

Example 2: The method of example 1, further comprising: demodulating the plurality of chirp returns based on the first set of code sequences by: digitizing, by the radar system, the plurality of chirp returns received by the one or more receive channels for application of a range fast Fourier transform (FFT); and responsive to digitizing the plurality of chirp returns received by the one or more receive channels: applying, by the radar system, the range FFT to the plurality of chirp returns received by the one or more receive channels; multiplying, by the radar system, the plurality of chirp returns received by the one or more receive channels by the first set of code sequences; and applying, by the radar system, a Doppler FFT to the plurality of chirp returns received by the one or more receive channels.

Example 3: The method of example 2, wherein applying the range FFT to the plurality of chirp returns received by the one or more receive channels further comprises: applying, by the radar system, a window function to the plurality of chirp returns prior to applying the range FFT.

Example 4: The method of example 2, wherein applying the Doppler FFT to the plurality of chirp returns received by the one or more receive channels further comprises: applying, by the radar system, a window function to the plurality of chirp returns prior to applying the Doppler FFT.

Example 5: The method of example 2, further comprising: generating, by the radar system, a range-Doppler map for each receive channel of the one or more receive channels for a non-coherent integration on the one or more receive channels.

Example 6: The method of example 5, further comprising: performing, by the radar system, the non-coherent integration for all of the range-Doppler maps generated for the one or more receive channels to form a single average range-Doppler map.

Example 7. The method of example 6, further comprising: generating, by the radar system, a rotator shifted range-Doppler average map by shifting the frequency phase of the range-Doppler map; and choosing, by the radar system, the minimal between the range-Doppler average map and the shifted range-Doppler average map.

Example 8: The method of example 1, wherein the first set of code sequences comprise binary codes.

Example 9: The method of example 1 further comprising: generating, by the radar system, each code sequence in the first set of code sequences using a random number generator that provides a unique code to each code sequence in the first set of code sequences with respect to each other code sequence from the first set of code sequences.

Example 10: The method of example 1, further comprising: modulating at least a third set of transmit channels based on: the first set of code sequences, the at least third set of transmit channels to transmit a plurality of chirps with the phase modulation that is defined by the first set of code sequences; and at least a second set of frequency phase shift sequences, the at least third set of transmit channels to transmit a plurality of chirp signals with a frequency phase shift that is defined by the at least second set of frequency phase shift sequences.

Example 11: A radar system comprising: a first set of transmit channels; a second set of transmit channels; one or more receive channels; and at least one processor configured to: modulate, based on a first set of code sequences, the first set of transmit channels to transmit a plurality of chirp signals with a phase-modulation that is defined by the first set of code sequences; modulate the second set of transmit channels based on: the first set of code sequences, a second set of transmit channels to transmit a plurality of chirps with the phase-modulation that is defined by the first set of code sequences; and a first set of frequency phase-shift sequences, the second set of transmit channels to transmit a plurality of chirp signals with a frequency phase-shift that is defined by the first set of frequency phase-shift sequences; responsive to transmitting the plurality of chirp signals associated with first set of transmit channels and the plurality of chirp signals associated with the second set of transmit channels, receive, from one or more receive channels, a plurality of chirp returns; and responsive to demodulating the plurality of chirp returns based on the first set of code sequences, output, to an automotive system, radar data identifying objects inferred from the demodulated plurality of chirp returns.

Example 12: The radar system of example 11, wherein the at least one processor is further configured to demodulate the plurality of chirp returns based on the first set of code sequences by: digitizing, by the radar system, the plurality of chirp returns received by the one or more receive channels for application of a range fast Fourier transform (FFT); and responsive to digitizing the plurality of chirp returns received by the one or more receive channels: applying, by the radar system, the range FFT to the plurality of chirp returns received by the one or more receive channels; multiplying, by the radar system, the plurality of chirp returns received by the one or more receive channels by the first set of code sequences; and applying, by the radar system, a Doppler FFT to the plurality of chirp returns received by the one or more receive channels.

Example 13: The radar system of example 12, wherein applying the range FFT to the plurality of chirp returns received by the one or more receive channels further comprises: applying, by the radar system, a window function to the plurality of chirp returns prior to applying the range FFT.

Example 14: The radar system of example 12, wherein applying the Doppler FFT to the plurality of chirp returns received by the one or more receive channels further comprises: applying, by the radar system, a window function to the plurality of chirp returns prior to applying the Doppler FFT.

Example 15: The radar system of example 12, wherein the at least one processor is further configured to demodulate the plurality of chirp returns by at least: generating, by the radar system, a range-Doppler map for each receive channel of the one or more receive channels for a non-coherent integration on the one or more receive channels.

Example 16: The radar system of example 15, wherein the at least one processor is further configured to demodulate the plurality of chirp returns by at least: performing, by the radar system, the non-coherent integration for all of the range-Doppler maps generated for the one or more receive channels to form a single average range-Doppler map.

Example 17: The method of claim 16, wherein the at least one processor is further configured to demodulate the plurality of chirp returns by at least: generating, by the radar system, a rotator shifted range-Doppler average map by shifting the frequency phase of the range-Doppler map; and choosing, by the radar system, the minimal between the range-Doppler average map and the shifted range-Doppler average map.

Example 18: The radar system of example 11, wherein the first set of code sequences comprise binary codes.

Example 19: The radar system of example 11, wherein the at least one processor is further configured to: generating, by the radar system, each code sequence in the first set of code sequences using a random number generator that provides a unique code to each code sequence in the first set of code sequences with respect to each other code sequence from the first set of code sequences.

Example 20: The radar system of example 11, further comprising at least a third set of transmit channels, and the at least one processor is further configured to modulate the at least third set of transmit channels based on: the first set of code sequences, the at least third set of transmit channels to transmit a plurality of chirps with the phase modulation that is defined by the first set of code sequences; and at least a second set of frequency phase shift sequences, the at least third set of transmit channels to transmit a plurality of chirp signals with a frequency phase shift that is defined by the at least second set of frequency phase shift sequences.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with increasing the quantity of radar channels can occur in other systems. Therefore, although described as a way to improve slow-time modulation techniques for multiple radar channels, the techniques of the foregoing description can be applied to other problems that depend on MIMO signal propagation.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method, the method comprising:
   simultaneously transmitting, by a radar system, a first plurality of chirp signals with first multiple channels of the radar system and a second plurality of chirp signals with second multiple channels of the radar system that are different than the first multiple channels using a slow-time modulation process comprising:
      modulating, using code-division multiplexing, the first plurality of chirp signals with a phase-modulation that is defined by a sequence of codes;
      modulating the second plurality of chirp signals using:
         code-division multiplexing with the phase-modulation that is defined by the sequence of codes; and
         frequency-division multiplexing, based on a frequency shift that is defined by a frequency shift sequence;
   responsive to simultaneously transmitting the first plurality of chirp signals and the second plurality of chirp signals, receiving, from one or more receive channels, a plurality of chirp returns corresponding to the first plurality of chirp signals and the second plurality of chirp signals; and
   responsive to demodulating the plurality of chirp returns based on the sequence of codes, outputting, by the radar system, to an automotive system, radar data identifying objects inferred from the demodulated plurality of chirp returns.

2. The method of claim 1, further comprising:
   demodulating the plurality of chirp returns in slow-time by:
      digitizing, by the radar system, the plurality of chirp returns received by the one or more receive channels for application of a range fast Fourier transform (FFT); and
      responsive to digitizing the plurality of chirp returns received by the one or more receive channels:
         applying, by the radar system, the range FFT to the plurality of chirp returns received by the one or more receive channels;
         multiplying, by the radar system, the plurality of chirp returns received by the one or more receive channels by the sequence of codes; and
         applying, by the radar system, a Doppler FFT to the plurality of chirp returns received by the one or more receive channels.

3. The method of claim 2, wherein applying the range FFT to the plurality of chirp returns received by the one or more receive channels further comprises:
   applying, by the radar system, a window function to the plurality of chirp returns prior to applying the range FFT.

4. The method of claim 2, wherein applying the Doppler FFT to the plurality of chirp returns received by the one or more receive channels further comprises:
   applying, by the radar system, a window function to the plurality of chirp returns prior to applying the Doppler FFT.

5. The method of claim 2, further comprising:
   generating, by the radar system, a range-Doppler map for each receive channel of the one or more receive channels for a non-coherent integration on the one or more receive channels.

6. The method of claim 5, further comprising:
   performing, by the radar system, the non-coherent integration for all the range-Doppler maps generated for the one or more receive channels to form a single average range-Doppler map.

7. The method of claim 6, further comprising:
   generating, by the radar system, a rotator shifted range-Doppler average map by shifting the frequency of the range-Doppler map; and
   choosing, by the radar system, the minimal between the range-Doppler average map and the shifted range-Doppler average map.

8. The method of claim 1, wherein the sequence of codes comprises binary codes.

9. The method of claim 1, further comprising:
   generating, by the radar system, each code in the sequence of codes using a random number generator that provides a unique code with respect to each other code, wherein each unique code is applied to a respective chirp signal.

10. The method of claim 1, wherein the frequency shift sequence is a first frequency shift sequence, the method further comprising:
    simultaneously transmitting a third plurality of chirp signals by third multiple channels; and
    modulating the third plurality of chirp signals based on:
       the sequence of codes with the phase modulation that is defined by the sequence of codes; and
       a frequency shift that is defined by a second frequency shift sequence.

11. A multiple-input-multiple-output (MIMO) radar system comprising:
    multiple first transmit channels;
    multiple second transmit channels that are different than the first multiple channels;
    multiple receive channels; and
    at least one processor configured to:
       simultaneously transmit a first plurality of chirp signals with the first multiple channels and a second plurality of chirp signals with the second multiple channels using a slow-time modulation method comprising:

modulating, using code-division multiplexing, the first plurality of chirp signals with a phase-modulation that is defined by a sequence of codes;
modulating the second plurality of chirp signals based on:
    code-division multiplexing with the phase-modulation that is defined by the sequence of codes; and
    frequency-division multiplexing based on a frequency shift that is defined by a frequency shift sequence;
responsive to simultaneously transmitting the first plurality of chirp signals and the second plurality of chirp signals, receive, from multiple receive channels, a plurality of chirp returns corresponding to the first plurality of chirp signals and the second plurality of chirp signals; and
responsive to demodulating the plurality of chirp returns in slow-time, output, to an automotive system, radar data identifying objects inferred from the demodulated plurality of chirp returns.

12. The MIMO radar system of claim 11, wherein the at least one processor is further configured to demodulate the plurality of chirp returns in slow-time by:
    digitizing, by the radar system, the plurality of chirp returns received by the multiple receive channels for application of a range fast Fourier transform (FFT); and
    responsive to digitizing the plurality of chirp returns received by the multiple receive channels:
        applying, by the radar system, the range FFT to the plurality of chirp returns received by the multiple receive channels;
        multiplying, by the radar system, the plurality of chirp returns received by the multiple receive channels by the sequence of codes; and
        applying, by the radar system, a Doppler FFT to the plurality of chirp returns received by the multiple receive channels.

13. The MIMO radar system of claim 12, wherein applying the range FFT to the plurality of chirp returns received by the multiple receive channels further comprises:
    applying, by the radar system, a window function to the plurality of chirp returns prior to applying the range FFT.

14. The MIMO radar system of claim 12, wherein applying the Doppler FFT to the plurality of chirp returns received by the multiple receive channels further comprises:
    applying, by the radar system, a window function to the plurality of chirp returns prior to applying the Doppler FFT.

15. The MIMO radar system of claim 12, wherein the at least one processor is further configured to demodulate the plurality of chirp returns by at least:
    generating a range-Doppler map for each receive channel of the multiple receive channels for a non-coherent integration on the one or more receive channels.

16. The MIMO radar system of claim 15, wherein the at least one processor is further configured to demodulate the plurality of chirp returns by at least:
    performing the non-coherent integration for all the range-Doppler maps generated for the multiple receive channels to form a single average range-Doppler map.

17. The MIMO radar system of claim 16, wherein the at least one processor is further configured to demodulate the plurality of chirp returns by at least:
    generating a rotator shifted range-Doppler average map by shifting the frequency of the range-Doppler map; and
    choosing the minimal between the range-Doppler average map and the shifted range-Doppler average map.

18. The MIMO radar system of claim 11, wherein the sequence of codes comprises binary codes.

19. The MIMO radar system of claim 11, wherein the at least one processor is further configured to:
    generate each code in the sequence of codes using a random number generator that provides a unique code with respect to each other code, wherein each unique code is applied to a respective chirp signal.

20. The MIMO radar system of claim 11, wherein the frequency shift sequence is a first frequency shift sequence, the radar system further comprising multiple third transmit channels, and the at least one processor is further configured to:
    simultaneously transmit a third plurality of chirp signals with the third multiple channels by;
        modulating the third plurality of chirp signals based on:
            the sequence of codes with the phase modulation that is defined by the sequence of codes; and
            further based on a frequency shift that is defined by a second frequency shift sequence, wherein the received chirp returns additionally correspond to the third plurality of chirp signals.

* * * * *